Figure 6:
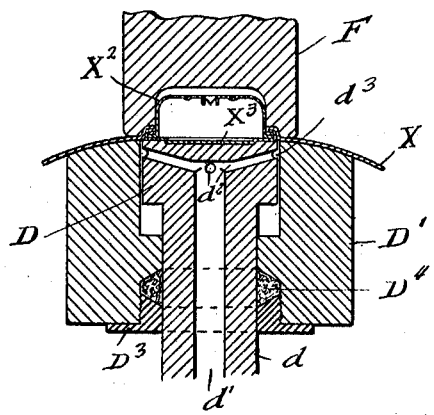

C. R. BENEDICT.
BAIL EAR ATTACHING MACHINE.
APPLICATION FILED NOV. 18, 1907.
1,003,691.
Patented Sept. 19, 1911.
3 SHEETS—SHEET 1.
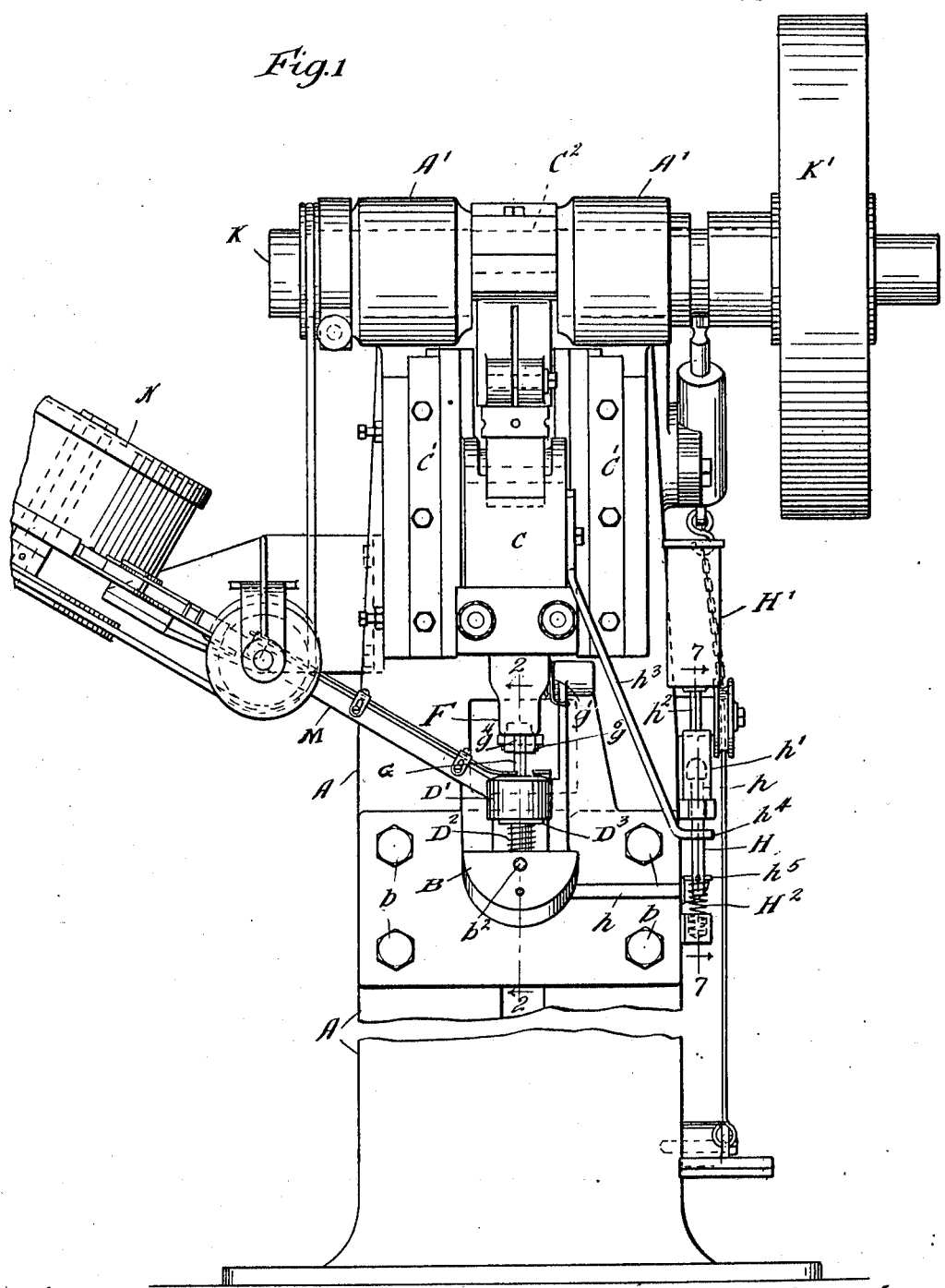
Witnesses:
Wm. Geiger
Inventor:
Charles R. Benedict
By Munday, Evarts, Adcock & Clarke
Attorneys C. R. BENEDICT.
BAIL EAR ATTACHING MACHINE.
APPLICATION FILED NOV. 18, 1907.
1,003,691.
Patented Sept. 19, 1911.
3 SHEETS—SHEET 2.
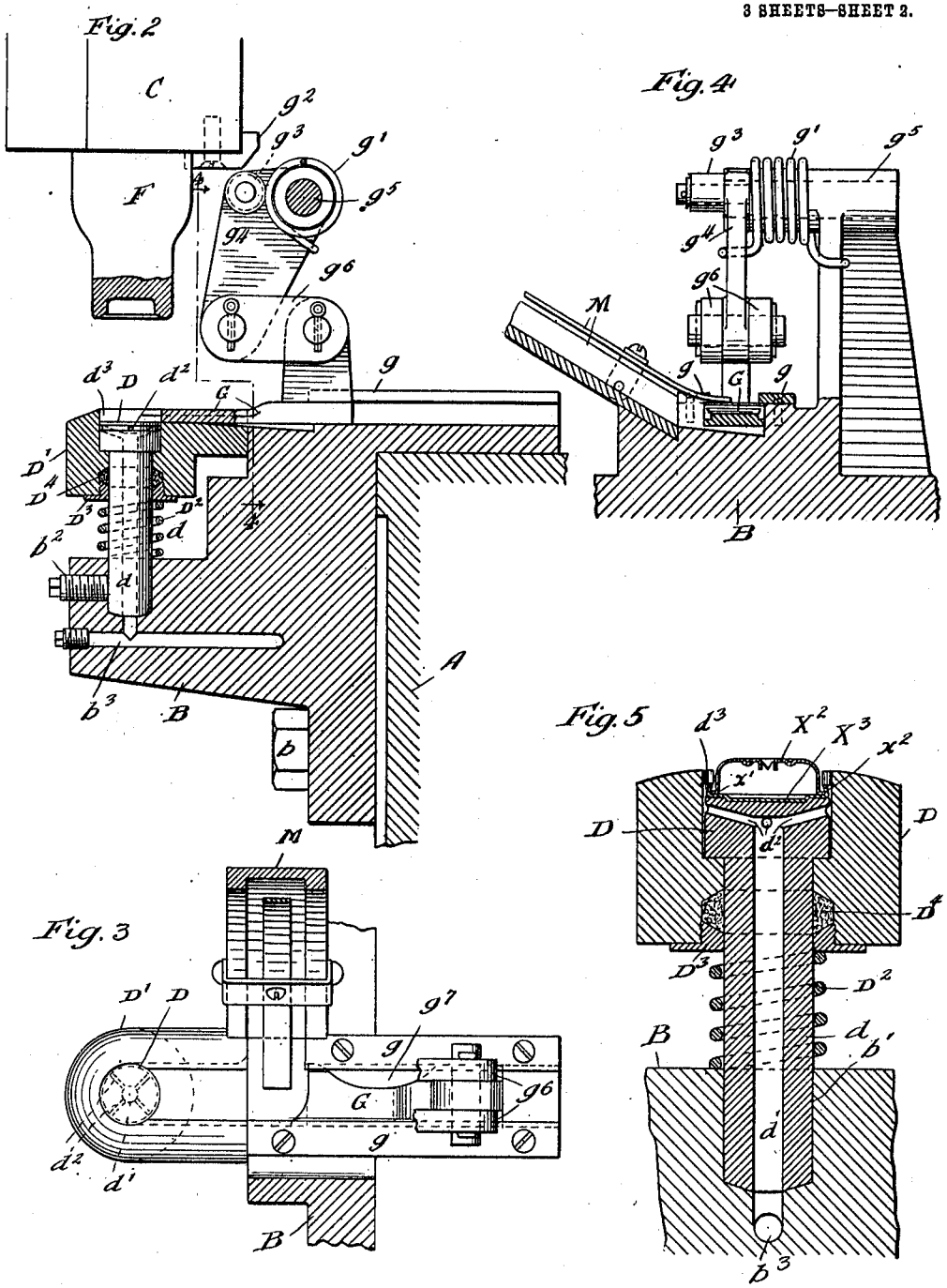
Witnesses:
Wm. Geiger
H. W. Munday
Inventor:
Charles R. Benedict
By Munday, Evarts, Adcock & Clarke.
Attorneys

C. R. BENEDICT.
BAIL EAR ATTACHING MACHINE.
APPLICATION FILED NOV. 18, 1907.

1,003,691.

Patented Sept. 19, 1911.
3 SHEETS—SHEET 3.

Witnesses:
Wm. Geiger
H. W. Munday

Inventor.
Charles R. Benedict
By Munday, Evarts, Adcock & Clarke,
Attorneys

UNITED STATES PATENT OFFICE.

CHARLES RANDOLPH BENEDICT, OF KANSAS CITY, MISSOURI, ASSIGNOR TO AMERICAN CAN COMPANY, OF NEW YORK, N. Y., A CORPORATION OF NEW JERSEY.

BAIL-EAR-ATTACHING MACHINE.

1,003,691.      Specification of Letters Patent.      Patented Sept. 19, 1911.

Application filed November 18, 1907. Serial No. 402,620.

*To all whom it may concern:*

Be it known that I, CHARLES RANDOLPH BENEDICT, a citizen of the United States, residing in Kansas City, in the county of Jackson and State of Missouri, have invented a new and useful Improvement in Bail-Ear-Attaching Machines, of which the following is a specification.

My invention relates to improvements in machines for attaching bail ears to sheet metal pails or vessels.

In machines heretofore in use for clenching or attaching bail ears to pails of the kind wherein the bail ear is inserted through an opening in the body of the pail, and secured by a folded seam, difficulty is experienced in producing a liquid tight seam or union between the bail ear and the pail body.

The object of my invention is to provide a machine of a simple, strong, efficient and durable construction, by means of which bail ears may be rapidly and cheaply attached to pail bodies and liquid tight closures produced between the bail ear and body, so that the difficulties heretofore experienced may be overcome.

My invention consists in the means I employ to practically accomplish this object or result; that is to say it consists, in connection with a horn over or upon which the pail bodies may be placed, and provided with a suitable bail ear clenching or seaming die and a reciprocating slide or punch carrying a coöperating bail ear clenching or seaming die, of a liquid packing feed device for automatically supplying shellac or other liquid packing to the seam or joint before the flanges or folds thereof are compressed together by the clenching or seaming dies, one of the two coöperating dies, preferably the one on the horn, being furnished with a suitable channel or passage through which the shellac or packing flows to the seam.

It further consists, in combination with these parts, of a feed slide for the bail ears, preferably automatically operated from or by the reciprocating slide of the upper die or punch, and a means for automatically operating the shellac or liquid packing feed device or valve, preferably also by connection with said reciprocating slide.

My invention also consists in the novel construction of parts and devices and in the novel combinations of parts and devices herein shown and described.

Figure 7:
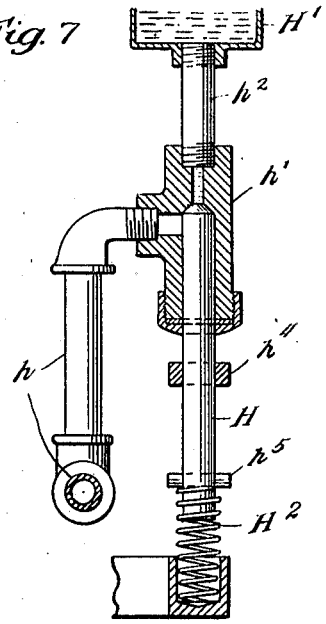
Figure 8:
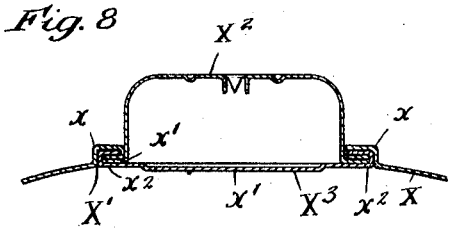
Figure 9:
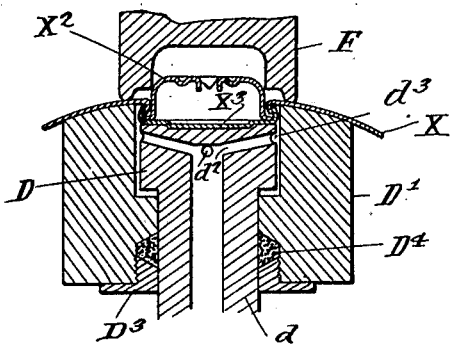

In the accompanying drawing, forming a part of this specification, Figure 1 is a front elevation of a bail ear attaching machine or press embodying my invention; Fig. 2 is a detail central vertical section on line 2—2 of Fig. 1; Fig. 3 is a detail plan view, partly in horizontal section, showing the bail ear feed slides; Fig. 4 is a detail vertical section on line 4—4 of Fig. 2; Fig. 5 is a detail vertical section showing the bail ear in the lower die before it is seamed to the body of the pail; Fig. 6 is a similar view after the bail ear is seamed to the body of the pail; Fig. 7 is a detail vertical section on line 7—7 of Fig. 1, showing the feed valve for the shellac or liquid packing; and Fig. 8 is a detail sectional view showing the bail ear after it is attached to the pail body with the shellac or liquid packing interposed between the folds of the seam which unites the bail ear to the body. Fig. 9 is a sectional view similar to Fig. 6, showing the pail and bail ear assembled in position ready for seaming.

In the drawing A represents the frame of the machine, B the horn which supports the lower die, C the reciprocating slide which carries the upper die, D the lower clenching or seaming die, the same having an outer movable member $D^1$, F the upper or reciprocating clenching or seaming die carried upon the reciprocating slide or punch C, G the feed slide for the bail ears, H the feed device for the shellac or liquid packing, and $H^1$ the reservoir or vessel containing the same.

The pail body X is furnished with an opening $X^1$ surrounded by a seaming flange $x$. The bail-ear $X^2$ is furnished with a base flange $x^1$ and with a cap $X^3$ having a seaming flange $x^2$. The bail-ear $X^2$ and cap $X^3$ are first assembled together, and the seaming flange on the cap slightly contracted so as to hold the bail-ear $X^2$ and the cap $X^3$ together. The bail-ear and cap thus assembled are first fed into the lower die on the horn, as shown in Fig. 5, and then the pail body is inserted over the horn in position to receive the bail ear, and then the upper die F depresses the movable member $D^1$ on the lower die, thus projecting the bail ear through the opening in the pail body and assembling the bail ear and cap with the pail body in position for clenching or seaming the same together, the further downward movement of the reciprocating slide or punch which operates the upper die, then actuates the shellac or packing feeder H and causes the requisite amount of shellac or liquid packing to be fed into the joint or seam before the flanges or folds thereof are closed or compressed together by the further downward movement of the upper die, which then takes place.

The horn B is secured to the frame A by bolts $b$.

The reciprocating slide C which actuates the upper die is moved up and down in its guides $C^1$ by a crank $C^2$ on the main driving shaft K which is journaled in suitable bearings $A^1$ on the frame of the machine, and furnished with a drive wheel $K^1$.

The main or central portion D of the lower die has a stem $d$ fitting in a suitable socket $b'$ in the horn B, and secured thereto by set screws $b^2$, and is furnished with a central channel $d^1$ and branch channels $d^2$ through which the shellac or liquid packing is supplied to the seaming flanges of the bail-ear, bail-ear-cap and pail-body. The outer or surounding portion $D^1$ of the lower die is furnished with a central socket or die cavity $d^3$ receiving and surrounding the main portion D of the lower die, the upper portion of this cavity also serving to receive the bail-ear, as will be readily understood from Figs. 4 and 5 of the drawing. The outer or surrounding portion $D^1$ of the lower die is mounted movably on the main portion D and is held in position by a coiled spring $D^2$ which surrounds the stem $d$ of the die D and bears against a stuffing box nut $D^3$ secured to the movable member $D^1$ of the die. The packing $D^4$ of the stuffing box prevents escape of the shellac or liquid packing from the die cavity $d^3$ of the die member $D^1$.

The horn B is furnished with a feed passage $b^3$ connecting with the feed passage $d^1$ in the stem $d$ of the lower die D, and with the feeder H through suitable connecting pipes $h$. The shellac or liquid packing feeder H preferably consists of a movable or reciprocating valve having a valve shell $h^1$, and connecting with the feed pipes $h$ leading to the lower seaming die and with the shellac or liquid packing reservoir $H^1$ through a connecting pipe $h^2$. The feed valve H is preferably held normally closed by a spring $H^2$, and it is preferably automatically opened, so as to feed or supply the requisite amount of shellac or liquid packing to the seam joint before the flanges thereof are closed or pressed together, from the reciprocating slide of the upper die by a connecting rod or strap $h^3$ secured to said slide, having an eye $h^4$ surrounding the stem of the valve H and engaging a pin $h^5$ thereon.

The bail ear feed slide G is mounted to reciprocate in suitable guides $g$, and is preferably actuated at suitable intervals as required in one direction by a spring $g^1$ and in the opposite direction by an incline or cam $g^2$ on the reciprocating slide C of the upper die F, which engages a roller $g^3$ on a crank arm or lever $g^4$ having a shaft or pivot $g^5$, and which is connected by a link $g^6$ with the bail ear feed slide G.

The bail ears with their caps assembled thereon are delivered in front of the feed slide G by a chute M, and the feed slide G is preferably furnished with a curved cavity $g^7$ on the edge thereof adjacent to the chute, so that as the feed slide is moved forward it will permit the bail ears in the chute to slightly descend, and so that when the feed slide moves backward it will force the column of bail ears in the chute slightly upward; this movement of the column of bail ears in the chute tending to prevent sticking and insuring certainty and regularity of feed.

N is a hopper containing the bail ears and a mechanism for feeding the bail ears one by one therefrom to the chute and feed slide; but as the same is a device not of my invention, I will not herein particularly describe the same. Of course it will be understood that, so far as my invention is concerned, the bail ears may be fed to the lower die by hand.

The upper bail ear clenching die F is provided with a central cavity as shown in Fig. 9 to receive the bail ear as the dies F and D close together to clench or seam the bail ear to the body of the pail.

I claim:

1. The combination with upper and lower clenching dies, of a coöperating feed device for supplying liquid packing to the seam before the flanges thereof are compressed together by said dies, and means for automatically operating said dies and said liquid packing feed device in coöperation with each other, substantially as specified.

2. The combination with upper and lower clenching dies, of a feed device for supplying liquid packing to the seam before the flanges thereof are compressed together by the dies, one of said dies having a feed passage connecting with said feed device, substantially as specified.

3. In a bail ear attaching machine, the combination with upper and lower clenching dies, of a feed device for supplying liquid packing to the seam before the flanges thereof are compressed together by the dies, one of said dies having a feed passage connecting with said feed device, and one of the dies having a die cavity to receive and surround the bail ear and its assembled cap prior to the application of the pail body thereto, substantially as specified.

4. In a bail ear attaching machine, the combination with upper and lower clenching dies, of a feed device for supplying liquid packing to the seam before the flanges thereof are compressed together by the dies, a reciprocating slide for operating one of said dies, and a connection therefrom for operating said feed device, substantially as specified.

5. In a bail ear attaching machine, the combination with a horn, a lower die carried by the horn having a hollow stem and a movable outer surrounding member provided with a die cavity adapted to receive the bail ear and its cap, of an upper reciprocating slide, an upper die carried thereby, a liquid packing reservoir, a feed device therefor, and a connection leading from said feed device to the hollow stem of the lower die, substantially as specified.

6. In a bail ear attaching machine, the combination with a horn, a lower die carried by the horn having a hollow stem and a movable outer surrounding member provided with a die cavity adapted to receive the bail ear and its cap, of an upper reciprocating slide, an upper die carried thereby, a liquid packing reservoir, a feed device therefor, a connection leading from said feed device to the hollow stem of the lower die, and means for operating said packing feed device from said reciprocating slide, substantially as specified.

7. In a bail ear attaching machine, the combination with a horn, a lower die carried by the horn having a hollow stem and a movable outer surrounding member provided with a die cavity adapted to receive the bail ear and its cap, of an upper reciprocating slide, an upper die carried thereby, a liquid packing carried thereby, a liquid packing reservoir, a feed device therefor, a connection leading from said feed device to the hollow stem of the lower die, a spring for holding said feed device normally closed, and a connection between said feed device and said reciprocating slide for opening the feed device just before the dies operate to compress the flanges of the seam, substantially as specified.

8. In a bail ear attaching machine, the combination with upper and lower clenching dies, of a feed device for supplying liquid packing or lacquer to the seam before the flanges thereof are compressed together by the dies, and a feed slide for the bail ears, substantially as specified.

9. In a bail ear attaching machine, the combination with upper and lower clenching dies, of a feed device for supplying liquid packing or lacquer to the seam before the flanges thereof are compressed together by the dies, a feed slide and a feed chute for the bail ears, substantially as specified.

10. In a bail ear attaching machine, the combination with upper and lower clenching dies, of a feed device for supplying liquid packing or lacquer to the seam before the flanges thereof are compressed together by the dies, one of said dies having a feed channel or passage connecting with said feed device, and one of the dies having a die cavity to receive and surround the bail ear and its assembled cap prior to the application of the pail body thereto, and a feed device for the bail ears, substantially as specified.

11. In a bail ear attaching machine, the combination with upper and lower clenching dies, of a feed device for supplying liquid packing to the seam before the flanges thereof are compressed together by the dies, one of said dies having a feed passage connecting with said feed device, and one of the dies having a die cavity to receive and surround the bail ear and its assembled cap prior to the application of the pail body thereto, a feed device for the bail ears and a feed chute for the bail ears, substantially as specified.

12. In a bail ear attaching machine, the combination with a horn, of a seaming die thereon, a reciprocating bail ear feed slide on the upper portion of the horn for pushing the bail ears into registry with said die and an upper reciprocating seaming die having a central cavity to receive within it the bail ear, substantially as specified.

13. In a bail ear attaching machine, the combination with a horn, of a seaming die thereon, a reciprocating bail ear feed slide on the upper portion of the horn for pushing the bail ear into registry with said die, and an upper seaming die having a central cavity to receive within it the bail ear and a reciprocating slide for operating said upper die, substantially as specified.

14. In a bail ear attaching machine, the combination with a horn, of a die thereon, a reciprocating feed slide on the horn for the bail ears, an upper seaming die and a reciprocating slide for operating the upper die, and a feed chute for delivering the bail ears to the bail ear feed slide, substantially as specified.

15. In a bail ear attaching machine, the combination with a horn, of a die thereon, a reciprocating feed slide for the bail ears, an upper seaming die and a reciprocating slide for operating the upper die, and a feed chute for delivering the bail ears to the bail ear feed slide, said feed slide having a curved recess on the edge thereof adjacent to said chute, substantially as specified.

16. In a bail ear attaching machine, the combination with a horn, of a die thereon, a reciprocating feed slide on the horn for the bail ears, an upper seaming die and a reciprocating slide for operating the upper die, said die reciprocating slide having a cam for operating the bail ear feed slide, substantially as specified.

17. In a bail ear attaching machine, the combination with a horn, of a die thereon, a reciprocating feed slide on the horn for the bail ears, an upper seaming die and a reciprocating slide for operating the upper die, said die reciprocating slide having a cam for operating the bail ear feed slide, and a spring for moving the bail ear feed slide in the opposite direction, substantially as specified.

18. In a bail ear attaching machine, the combination with a horn, of a die thereon, a reciprocating feed slide for the bail ears, an upper seaming die and a reciprocating slide for operating the upper die, said die reciprocating slide having a cam for operating the bail ear feed slide, a spring for moving the bail ear feed slide in the opposite direction, and a crank arm and link connection between the bail ear feed slide and the die reciprocating slide, substantially as specified.

CHARLES RANDOLPH BENEDICT.

Witnesses:
E. C. RITCHELL,
K. Z. KNOX.

---

Copies of this patent may be obtained for five cents each, by addressing the "Commissioner of Patents, Washington, D. C."